Figure 1:
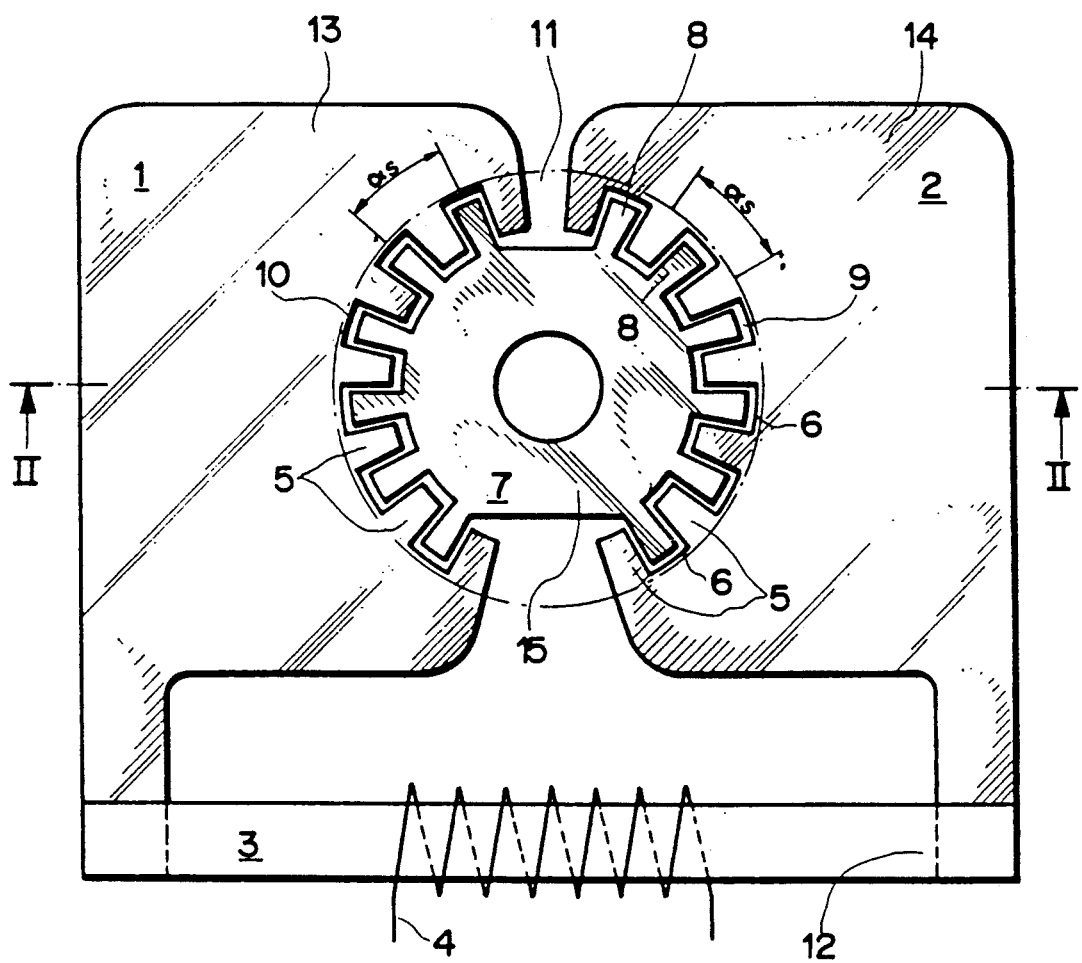

United States Patent

Tu et al.

[11] Patent Number: 5,051,633
[45] Date of Patent: Sep. 24, 1991

[54] MULTIPOLAR STEPPING MOTOR

[75] Inventors: Mai X. Tu, Chavannes; Michel Schwab, Bienne, both of Switzerland

[73] Assignee: Matthias Scholer, Huttwil, Switzerland

[21] Appl. No.: 390,989

[22] Filed: Aug. 9, 1989

[30] Foreign Application Priority Data

Aug. 25, 1988 [CH] Switzerland .................. 3162/88

[51] Int. Cl.⁵ .................................. H02K 37/00
[52] U.S. Cl. ............................ 310/49 R; 310/257
[58] Field of Search ............. 310/40 MM, 49 R, 257, 310/156

[56] References Cited

U.S. PATENT DOCUMENTS

| 4,386,287 | 5/1983 | Karasawa et al. | 310/49 R |
| 4,506,182 | 3/1985 | Rohdin | 310/193 |
| 4,713,565 | 7/1984 | Grosjean | 310/49 R |
| 4,792,709 | 12/1988 | Smith et al. | 310/49 R |

FOREIGN PATENT DOCUMENTS

| 2406907 | 9/1978 | France . | |
| 53-140518 | 5/1977 | Japan . | |
| 121115 | 10/1978 | Japan | 310/49 R |
| 599707 | 9/1976 | Switzerland . | |
| 2007035 | 5/1979 | United Kingdom . | |

Primary Examiner—Steven L. Stephan
Assistant Examiner—Judson H. Jones
Attorney, Agent, or Firm—Oliff & Berridge

[57] ABSTRACT

A multipolar rotor (11) is magnetized axially and comprises, in one of its faces situated opposite two pole pieces (1 and 2), alternate north and south poles distributed along its periphery. Each of the pole pieces has a concave inside rim provided with teeth (5) separated by interposed zones (6). A core (3), on which a coil (4) is mounted, magnetically couples the pole pieces to the coil. The pitch $\alpha s$ of the teeth of the pole pieces is different from the pitch $\alpha r$ of the poles of the rotor.

9 Claims, 4 Drawing Sheets

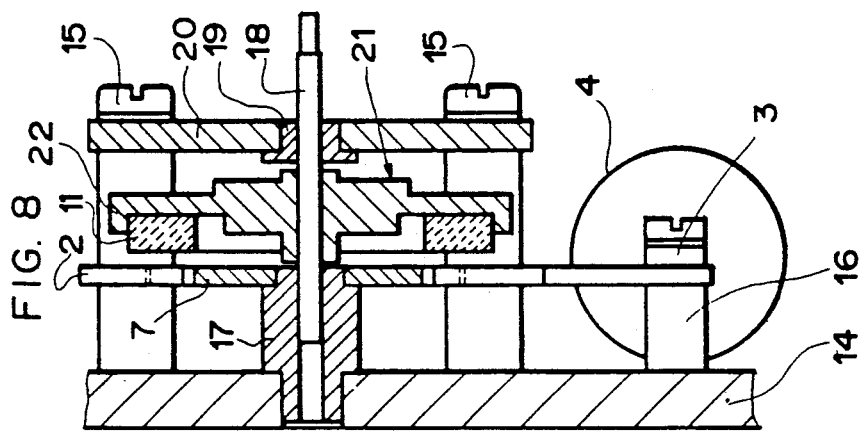
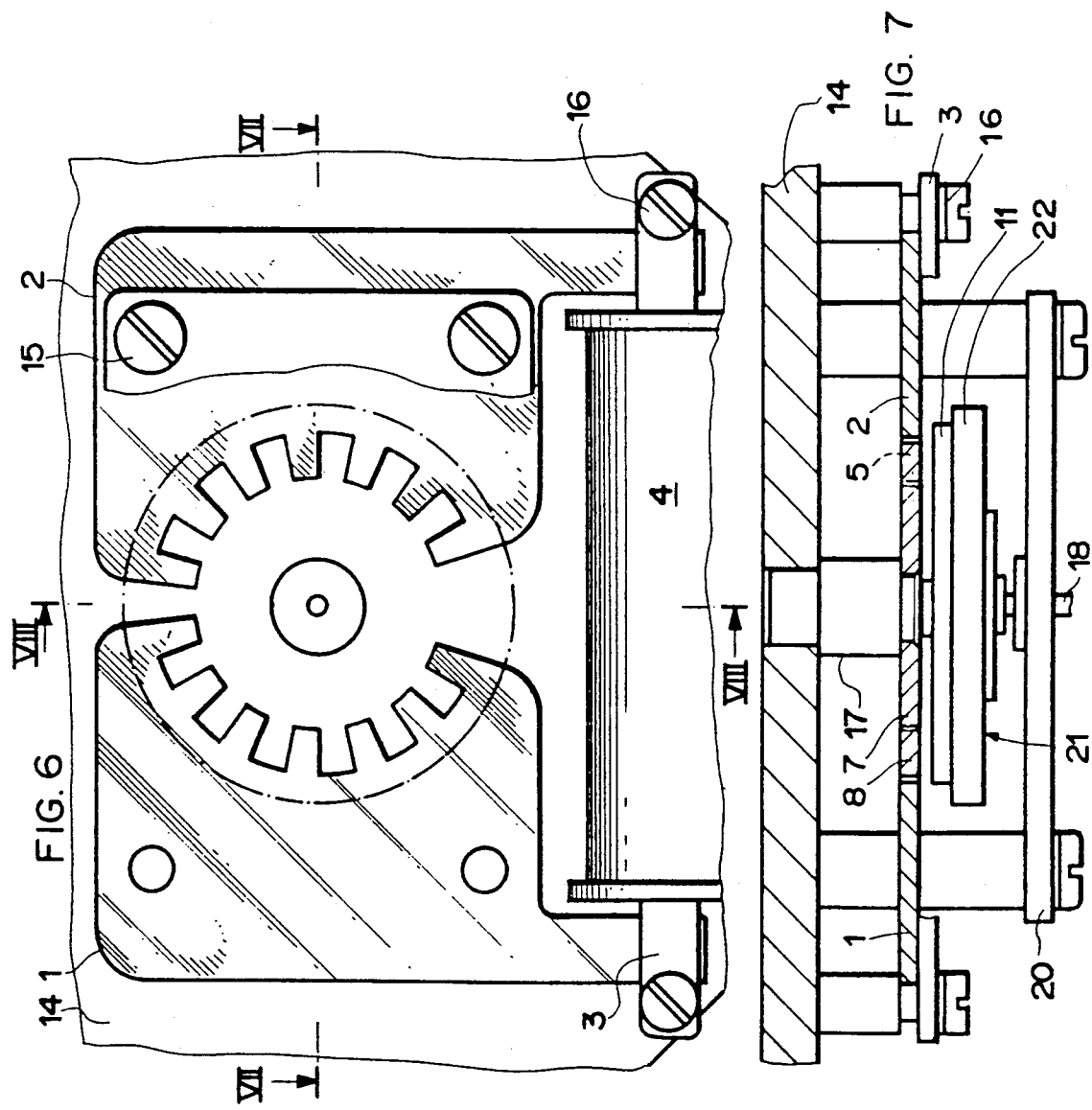

MULTIPOLAR STEPPING MOTOR

This invention relates to electric motors, and more particularly to a multipolar stepping motor of the type having a permanently magnetized rotor with N pairs of poles distributed about a central axis and magnetized in a direction parallel to that axis, and a magnetic stator circuit comprising a winding mounted on a core, and two main pole pieces extending facing one another in the same plane perpendicular to the mentioned axis, each of these pieces being connected to one end of the core, and having a concave rim provided with pole teeth distributed about the mentioned axis, and the rotor extending in a plane parallel to that of the pole pieces.

It has long been attempted to design multipolar stepping motors which are capable of having a relatively large number of pairs of poles while still being inexpensive to manufacture, as well as compact.

Multipolar stepping motors are disclosed particularly in Swiss Patent No. 599,707, U.S. Pat. No. 4,713,565, and French Patent No. 2,406,907. In the first of these patents, two embodiments are described and illustrated in FIGS. 1-2 and 5-6, respectively. In the exemplified embodiment depicted in FIGS. 1 and 2, a disk-shaped rotor is placed in the air gap formed by pole pieces 1a and 5, 5a. The assembly of these three elements is, moreover, placed on a cylindrical coil 6 and on an annular part 2. Such an arrangement represents a great waste of space in height and complication in assembly. In the exemplified embodiment shown in FIGS. 5 and 6, there is the same superposition of the pole pieces 51a and 55a.

In U.S. Pat. No. 4,713,565, a motor is described having stator pole pieces which are likewise placed in different planes on either side of that of the magnet, which represents a waste of space in height. Moreover, the arms of the inside stators, designated 14a and 14b, are practically the same width as a rotor pole. As these inside stators are connected to the stator support by only one arm each, it will be understood that this design leads to manufacturing problems, as well as to problems of mechanical stability and magnetic saturation if the number of poles of the rotor is large, given the narrow width which remains available for the connecting arms.

The multipolar stepping motors described in French Patent No. 2,406,907 are also of the type comprising a permanently magnetized rotor with N pole pairs distributed about a central axis and magnetized in a direction parallel to that axis, and a magnetic stator circuit comprising a winding mounted on a core. Moreover, they comprise two main pole pieces facing one another in the same plane perpendicular to the mentioned axis; each of these pieces is connected to one of the ends of the core and has a concave rim provided with pole teeth distributed about the axis, and the rotor extends in a plane parallel to that of the pole pieces.

However, this design does not remedy the drawbacks mentioned above to the full extent desirable, especially not those of the designs disclosed in U.S. Pat. No. 4,713,565. In particular, the problem of the holding of the bottom bearing of the shaft of the rotor is not always solved satisfactorily.

It is an object of this invention to provide an improved multipolar stepping motor having more precise positioning of the rotor relative to the stator and an improved shape of the magnetic flux which appears at the time of the pulses in order to achieve a precise and reliable drive of the motor.

Another object of the invention is to provide such a motor making 60 steps per rotation in a simple, low design without any significant concession as to output.

To this end, in the multipolar stepping motor according to the present invention, of the type initially described, an intermediate pole piece is placed between the main pole pieces and has intermediate teeth situated opposite the pole teeth and engaged between them.

Figure 2:
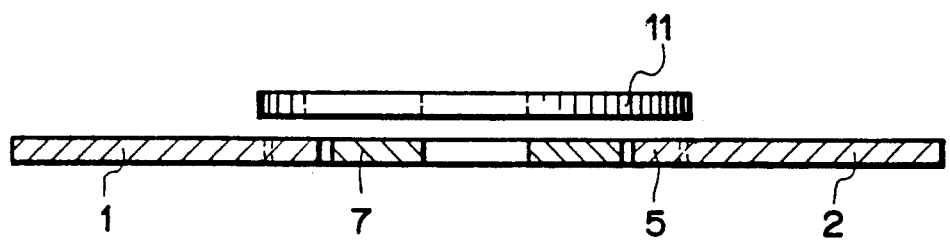
Figure 3:
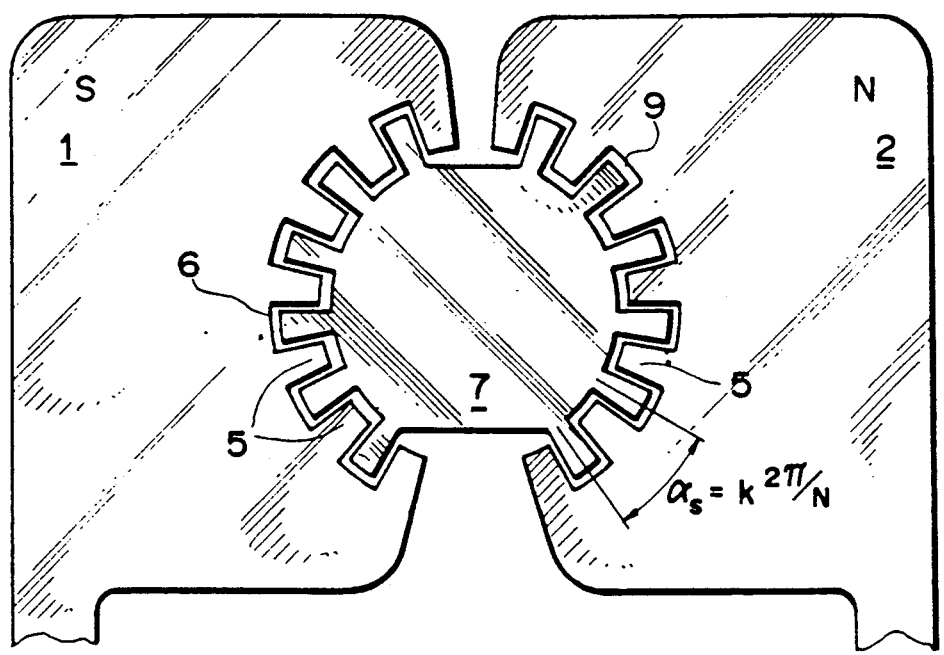
Figure 4:
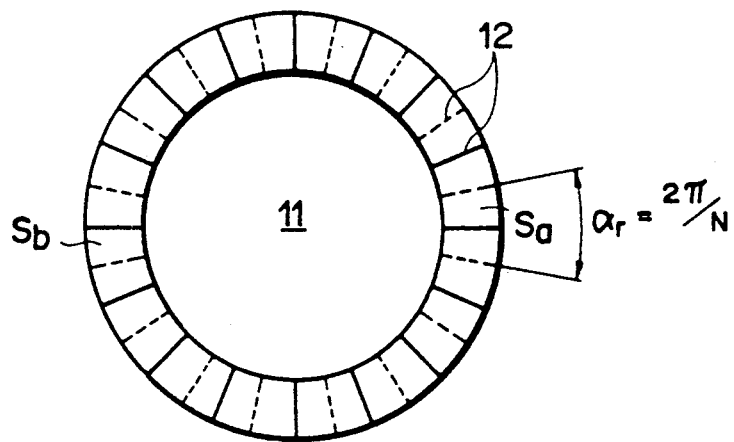
Figure 5:
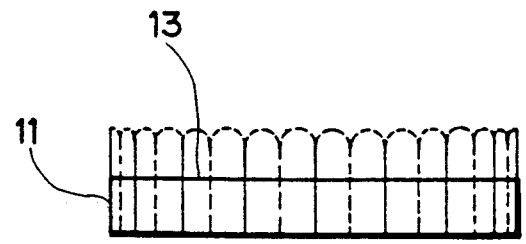
Figure 9:
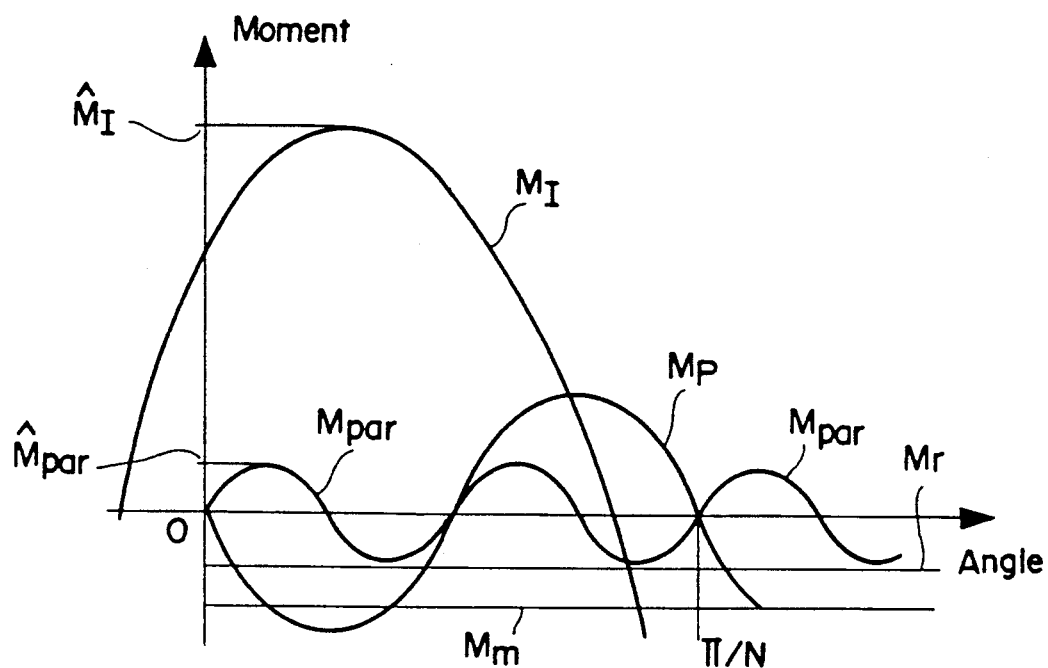
Figure 10:
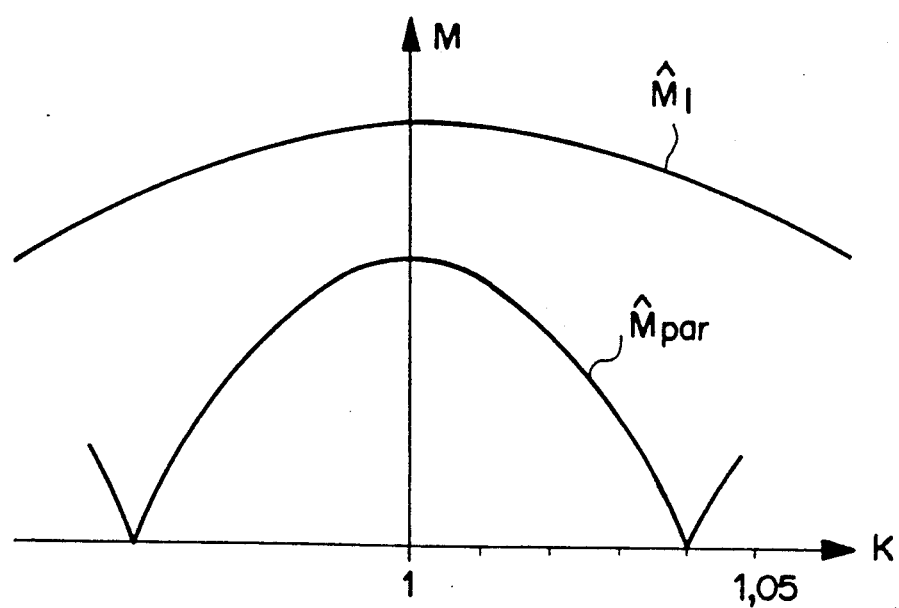

A preferred embodiment of the invention will now be described in detail with reference to the accompanying drawings, in which:

FIG. 1 is a diagrammatic top plan view of the magnetic circuit,

FIG. 2 is a likewise diagrammatic sectional view of the circuit of FIG. 1 taken on the line II—II of that figure, FIGS. 3, 4, and 5 are diagrammatic plan views and an elevation of the magnetic circuit and the rotor of the motor to be described, by means of which its operation will be explained, FIGS. 6, 7, and 8 are a top plan view and sections taken on the lines VII—VII and VIII—VIII, respectively, of the motor to be described as a whole, FIG. 9 is a graph explaining the study of the optimization of the structural characteristics of the motor, and FIG. 10 is another graph likewise relating to the study of optimization of the characteristics.

The motor to be described is a monophase multipolar motor comprising two main pole pieces 1 and 2 connected magnetically to the ends of a core 3 bearing an exciting coil 4. In the diagrammatic illustration of FIG. 1, pole pieces 1 and 2 are completely flat and connected to core 3 by overlapping. The connection may be carried out by soldering or otherwise. In one modification, provision might be made for one of the pole pieces to be shaped, e.g., by blanking in one piece with the core. In this case, the other pole piece should have a bend so that its connection tongue is in contact with one of the end faces of the core. The material of which pole pieces 1 and 2 and core 3 are made is a ferromagnetic metal having a high limit of saturation and low remanence.

An electronic device (not shown) periodically sends pulses of alternating polarity through coil 4 so that each of the two main pole pieces 1 and 2 alternately acts as north magnetic pole and south magnetic pole. As may be seen in FIG. 2, the two main pole pieces 1 and 2 are coplanar. They are situated opposite one another and each have an inner rim of concave appearance, blanked with a contour having a number of pole teeth 5. In the case illustrated in FIG. 1, pole teeth 5 are trapezoidal and separated by interposed zones 6, the edges of which are arc sections of a circle centered on an axis perpendicular to the plane of the pole pieces 1 and 2. This central axis coincides with the axis of the rotor of the motor.

In the embodiment being described, the pole teeth of each of the two pole pieces 1 and 2 form a group of seven teeth having a stator pole pitch $\alpha s$. The teeth 5 at the two ends of the group in each of the pole pieces 1 and 2 are situated, as shown in FIG. 1, facing a homologous tooth 5 of the opposite pole piece, and each of these pairs of homologous teeth 5 delimits an air gap of a certain width. As is apparent from FIG. 1, the two air gaps in question are not of the same width, but this arrangement is not critical for achieving the intended object. As a matter of fact, it is seen that between pole pieces 1 and 2 there is an intermediate pole piece 7 which is likewise a flat plate of the same thickness as pole pieces 1 and 2, likewise of a low-remanence ferromagnetic material having a high saturation limit. This intermediate piece has a generally circular shape with two groups of intermediate teeth 8 disposed along its periphery in a contour complementary to that of pole teeth 5 and meshing therewith so as to define, between piece 7 and each of the pieces 1 and 2, two meander-shaped air gaps 9 and 10 of substantially constant but narrow width.

The magnetic field extending into the space adjacent to air gaps 9 and 10 at the time of the pulses co-operates with a rotor 11 consisting of a permanently magnetized flat disk or ring having multipolar magnetization with alternately north and south poles distributed along the periphery of the rotor according to a magnetization direction which is parallel to the axis, i.e., perpendicular to the plane of magnetic circuit 1, 7, 2, 3.

FIGS. 3, 4, and 5 show how rotor 11, shown diagrammatically, co-operates with pole pieces 1 and 2. It is seen in FIGS. 4 and 5 that the magnetization of rotor 11 is so conceived that poles 12 are all visible on one of the faces 13 of the rotor. Along the edge of this face 13, therefore, north and south poles are alternatingly distributed at a pole pitch having the value $\alpha r$. In the embodiment illustrated, rotor 11 is magnetized with thirty-two poles, i.e., sixteen pairs of poles, so that the angular pitch $\alpha r$ is equal to $2\pi/16$. The appearance of the magnetic field developed in the space by poles 12 is presented diagrammatically in FIG. 5.

FIG. 3 shows an optional characteristic of the motor being described. While the angular pitch of the pole pairs of rotor 11 is equal to $\alpha r$, as is seen in FIG. 4, the angular pitch $\alpha s$ of the pole teeth of each of the pole pieces 1 and 2 is slightly different from the pole pitch $\alpha r$. In fact, as will be seen below, it may be chosen at a value which will generally be comprised between 0.8 and $1.2 \times \alpha r$ in order to reduce, to the extent which appears the most desirable, interfering torques which might otherwise disturb the operation of the motor.

In principle, this operation is as follows:

Assuming a pulse of long duration polarizing piece 2 as north pole and piece 1 as south pole (FIG. 3), rotor 11 (FIG. 4) is going to stop in a position such that a magnetic rotor axis defined, for example, by a diametrical line between two opposite poles $S_a$ and $S_b$ is placed symmetrically relative to the magnetic stator axis of pole pieces 1 and 2. It is common knowledge that with a motor of this type, provision must be made during stepping operation that in the absence of a pulse, the rotor is spontaneously oriented in a different direction from that stopping position. For that purpose, there will be provided, for instance, in specific locations of pieces 1, 2 and/or 7, apertures or otherwise shaped profile segments having an asymmetrical contour so as to force the rotor to assume a resting position slightly different from the one shown in FIG. 3. It will be understood that upon the following pulse, if pole piece 1 is polarized as north pole and pole piece 2 as south pole, the rotor will be subject to a driving torque which will cause it to rotate by one step, i.e., through an angle equal to $\frac{1}{2}\alpha r = 2\pi/2N$, so that the pole $S_b$ will come to be placed symmetrically on one of the teeth 5 of pole piece 1.

Since the angular pitch of the stator teeth is slightly different—here, slightly greater—than the angular pitch of the pole pairs of the rotor, the poles adjacent to those designated $S_a$ and $S_b$ in FIG. 4 will not be in symmetrical positions relative to teeth 5 of pole pieces 1 and 2 (FIG. 3) which they cover. It is this arrangement which, as will be seen below, has the effect of attenuating or even eliminating certain interfering torques.

Before examining in greater detail the determination of the conditions permitting these interfering torques to be mastered, an example of a practical application of the motor will now be described with reference to FIGS. 6, 7, and 8. Pole pieces 1 and 2 are fixed via screw pedestals 15 and 16 to a base plate 14 so that they are in the same plane parallel to that of plate 14. They are disposed in the same way as in FIGS. 1 and 3, and screw pedestals 16 likewise secure, relative to plate 14, core 3 on which exciting coil 4 is mounted. Intermediate pole piece 7 is fixed on a multipart support 17 fitted into a central hole in plate 14 and simultaneously acting as a bearing for a shaft 18 of rotor 21 and as a holding part for intermediate pole piece 7. Another bearing 19 guiding shaft 18 is fixed to a rectangular cover plate 20 spaced from base plate 14 by screw pedestals 15.

Rotor assembly 21 of the motor described comprises an armature 22, the contours of which are seen in FIG. 8, through which shaft 18 passes and in which magnetized ring 11 of the rotor is set. Shaft 18 projects above plate 20 and can receive a coupling piece supporting any element to be driven by the rotor. In mass production, rotor assembly 21 might be produced wholly or in part by an injection operation of a magnetic material such as plastoferrite, for example.

We shall now turn again to one of the characteristics of the design described which makes it possible freely to determine certain structural parameters as a function of the desired performance.

As is seen in FIG. 3, owing to the presence of intermediate pole piece 7, the magnetic flux which develops in the space at the time of the pulses is strictly channeled by meander-shaped air gap 9.

The graph of FIG. 9 shows the curves of various torques which must be taken into account for designing the motor. The curve of torque $M_i$ represents the moment of force exerted on the rotor at the time of the pulse as a function of its angular position relative to the stator. This is a periodic curve, the period of which is equal to $\alpha s = 2\pi/N$. Curve $M_p$ represents the blocking torque which ensures the positioning of the rotor during the periods between pulses. Its period is equal to $\alpha s/2$, or $2\pi/2N$. The curve designated $M_{par}$ represents one of the numerous interfering torques, the presence of which depends upon the shape of the pole teeth and the pitch of these groups of teeth designated by reference numeral 5 in FIG. 1. The shape of this curve may be modified by a judicious choice of the parameter k which gives the ratio between the pitch of the pole toothing and the pitch of the poles of the rotor. These interfering torques are the higher harmonics of the positioning torque $M_i$. Depending on the case, it may be of interest to eliminate harmonic 2 or harmonic 4. It is by means of a circumspect choice of the ratio k that this result can be brought about. Finally, the line $M_r$ indicates the frictional section modulus due to the bearing. Torque Mm represents the sum of the external mechanical torques acting upon the rotor, such as the frictional torque in the gear train, the torque of the unbalance of the hands, etc.

Experimental studies carried out on a prototype have shown that it is possible to establish, relative to a given prototype, a graph of the kind shown as FIG. 10 indicating the curve of the variation of amplitudes of torques $M_i$ and $M_{par}$ as a function of the value chosen for parameter k. In the case of FIG. 10, the interfering moment $M_{par}$ is the moment of harmonic 2 of $M_p$; and it is seen, for example, that this interfering moment can be eliminated by choosing the value 1.04 for coefficient k. Although the choice of the coefficient leads to a slight reduction in the amplitude of $M_i$, this reduction is not significant.

Thus, the arrangement described above makes it possible not only to produce a small, and especially low, motor capable of being easily constructed with a high number of steps per rotation, particularly for easily reaching sixty steps per rotation, but also to study the dimensioning of this motor so that the operating conditions may be optimal, and in particular that energy consumption may be as low as possible. This motor notably allows the production of timepieces in which the seconds hand can be mounted directly on the driving shaft, thus considerably reducing the number of gear trains necessary.

As has been seen in FIG. 5, in the embodiment described the effect of the magnetization of the rotor is that all the poles succeed one another on the same face of the magnetized ring. However, another embodiment might be conceived, comprising a rotor with magnetization purely parallel to the axis, i.e., one having both faces magnetized, wherein the pole sectors of one of the faces are always directly opposite pole sectors of reverse polarity on the other face. In still another modification, the means for blocking the rotor, intended to stop it between pulses, might be formed by ferromagnetic elements disposed facing the rim of the rotor or its front face opposite the pole pieces. Numerous modifications of the embodiment described are possible.

What is claimed is:

1. A multipolar stepping motor of the type having a central axis, a permanently magnetized rotor with N pairs of poles distributed about said central axis and magnetized in a direction parallel thereto, and a magnetic stator circuit comprising a core, a winding mounted on said core, and two main pole pieces facing one another in the same plane perpendicular to said axis, each of said pole pieces being connected to a respective end of said core and having a concave rim provided with pole teeth distributed about said axis, and said rotor being situated in a plane parallel to that of said pole pieces, wherein the improvement comprises:

an intermediate pole piece disposed between said main pole pieces and including intermediate teeth situated opposite said pole teeth and meshing therewith.

2. The motor of claim 1, wherein the contours of said intermediate pole piece and of said main pole pieces are complementary and bound a meander-shaped air gap of substantially constant width.

3. The motor of claim 2, wherein the angular pitch of said pole teeth is different from the angular pitch of said poles of said rotor.

4. The motor of claim 3, wherein the angular pitch $\alpha s$ of said pole teeth is defined by the equation $\alpha s = k \cdot 2\pi/N$, wherein k is a factor between 0.8 and 1.2, and $2\pi/N$ is equal to the angular pitch $\alpha r$ of said poles of said rotor.

5. The motor of claim 1, wherein said magnetic stator circuit includes at least one asymmetrical holding element capable of maintaining said rotor during the periods between pulses in an angular position such that a driving torque acts upon said rotor when a current passes through said winding.

6. The motor of claim 5, wherein said asymmetrical element is composed of a series of apertures contrived in said main pole pieces.

7. The motor of claim 5, wherein said asymmetrical element is composed of a series of apertures contrived in said main pole pieces and in said intermediate pole piece.

8. The motor of claim 5, wherein said asymmetrical element is composed of a series of apertures contrived in said intermediate pole piece.

9. The motor of claim 1, wherein said rotor comprises thirty said pairs of poles distributed on one of its front faces turned toward said main pole pieces.

* * * * *